United States Patent
Tsukagoshi

(10) Patent No.: US 8,896,596 B2
(45) Date of Patent: Nov. 25, 2014

(54) IMAGE SIGNAL PROCESSING APPARATUS, IMAGE SIGNAL PROCESSING METHOD, PROGRAM, AND IMAGE SIGNAL PROCESSING SYSTEM

(71) Applicant: Sony Corporation, Tokyo (JP)

(72) Inventor: Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/933,410

(22) Filed: Jul. 2, 2013

(65) Prior Publication Data

US 2013/0293536 A1     Nov. 7, 2013

Related U.S. Application Data

(63) Continuation of application No. 12/807,619, filed on Sep. 9, 2010, now Pat. No. 8,508,528.

(30) Foreign Application Priority Data

Sep. 29, 2009   (JP) ................................ P2009-224012

(51) Int. Cl.
    *G06T 15/00*     (2011.01)
    *H04N 13/04*     (2006.01)

(52) U.S. Cl.
    CPC ............ *G06T 15/00* (2013.01); *H04N 13/0404* (2013.01); *H04N 13/0456* (2013.01); *H04N 13/0409* (2013.01)
    USPC ......................................................... 345/419

(58) Field of Classification Search
    CPC ...... G06T 15/00; H04N 13/00; H04N 13/004; H04N 13/0456
    See application file for complete search history.

(56) References Cited

U.S. PATENT DOCUMENTS 5,831,765 A    11/1998   Nakayama et al.
7,233,347 B2   6/2007    Jones et al.
(Continued)

FOREIGN PATENT DOCUMENTS

DE    102006019169 A1    10/2007
JP         09-102969        4/1997
(Continued)

OTHER PUBLICATIONS

European Search Report from EP Application No. 10177798, dated May 27, 2013.

(Continued)

*Primary Examiner* — Hau Nguyen
*Assistant Examiner* — Ryan M Gray
(74) *Attorney, Agent, or Firm* — Lerner, David, Littenberg, Krumholz & Mentlik, LLP

(57) ABSTRACT

An image signal processing apparatus includes a receiving unit that receives a display signal including an image signal containing both two-dimensional and three-dimensional images and a region information in each predetermined unit in the image signal and separates the image signal and the region information from the display signal, a display control unit that generates a first display control information for controlling rendering positions of the first and second regions in the image signal according to the region information and a second display control information for selectively displaying a three-dimensional image in a region corresponding to the rendering position of the second region based on the region information, and a processing unit that generates a display image signal indicating an image where the first and second region are arranged according to the first display control information based on the image signal and the first display control information.

14 Claims, 13 Drawing Sheets

(56) References Cited

U.S. PATENT DOCUMENTS

| | | |
|---|---|---|
| 8,111,283 B2 | 2/2012 | Kim et al. |
| 8,174,465 B2 | 5/2012 | Takagi et al. |
| 8,207,961 B2 | 6/2012 | Song et al. |
| 8,259,162 B2 | 9/2012 | Kim et al. |
| 2006/0139448 A1 | 6/2006 | Ha et al. |
| 2007/0242068 A1 | 10/2007 | Han et al. |
| 2008/0252639 A1 | 10/2008 | Ijzerman et al. |
| 2010/0260418 A1 | 10/2010 | Tsai et al. |

FOREIGN PATENT DOCUMENTS

| | | |
|---|---|---|
| JP | 10-224825 | 8/1998 |
| JP | 11-289555 A | 10/1999 |
| JP | 2005229384 A | 8/2005 |
| JP | 2009070116 A | 4/2009 |
| WO | 2006111919 A2 | 10/2006 |
| WO | 2007007285 A2 | 1/2007 |

OTHER PUBLICATIONS

Office Action from Japanese Application No. 2009-224012, dated Jun. 4, 2013.

FIG. 11

| G | H | I |
|---|---|---|
| | 3D_flag | Scaling Destination |
| Regin_0 Video | "2D" | (H_End_Pos0 – H_Start_Pos0, V_End_Pos0 – V_Start_Pos0) |
| Regin_1 Video | "3D" | (H_End_Pos1 – H_Start_Pos1, V_End_Pos1 – V_Start_Pos1) |
| Regin_2 Video | "3D" | (H_End_Pos2 – H_Start_Pos2, V_End_Pos2 – V_Start_Pos2) |
| Regin_3 Subtitle | "2D" | (H_End_Pos3 – H_Start_Pos3, V_End_Pos3 – V_Start_Pos3) |
| Regin_4 Logo | "3D" | (H_End_Pos4 – H_Start_Pos4, V_End_Pos4 – V_Start_Pos4) |
| Regin_5 Text | "2D" | (H_End_Pos5 – H_Start_Pos5, V_End_Pos5 – V_Start_Pos5) |
| Regin_6 Text | "3D" | (H_End_Pos6 – H_Start_Pos6, V_End_Pos6 – V_Start_Pos6) |

IMAGE SIGNAL PROCESSING APPARATUS, IMAGE SIGNAL PROCESSING METHOD, PROGRAM, AND IMAGE SIGNAL PROCESSING SYSTEM

CROSS-REFERENCE TO RELATED APPLICATION

The present application is a continuation of U.S. application Ser. No. 12/807,619, filed Sep. 9, 2010, now U.S. Pat. No. 8,508,528, which claims priority from Japanese Patent Application No. JP 2009-224012, filed in the Japan Patent Office on Sep. 29, 2009, the entire content of which is incorporated herein by reference.

BACKGROUND OF THE INVENTION

1. Field of the Invention

The present invention relates to an image signal processing apparatus, an image signal processing method, a program, and an image signal processing system.

2. Description of the Related Art

Recently, a display apparatus that can process an image signal (a right-eye image signal, a left-eye image signal) indicating a three-dimensional image and display a three-dimensional image on a display screen has been under development. Among systems to make a user recognize an image displayed on a display apparatus as a three-dimensional image is a system that makes a user visually recognize a three-dimensional image by using user's line-of-sight parallax such as a parallax barrier system or a lenticular system, for example. By using such a system, it is possible to make a user visually recognize a three-dimensional image without using an external apparatus such as polarized glasses or liquid crystal shutter glasses.

In such a background, a technique to enhance image quality when displaying an image containing both a two-dimensional image and a three-dimensional image on a display screen has been developed. A technique that, on the basis of an information that defines a position to display a three-dimensional image, sets a part corresponding to the information on a display screen to a state for a user to selectively visually recognize a three-dimensional image is disclosed in Japanese Unexamined Patent Publication No. 9-102969, for example.

SUMMARY OF THE INVENTION

The technique to enhance image quality when displaying an image containing both a two-dimensional image and a three-dimensional image on a display screen (which is referred to hereinafter simply as "related art" in some cases) sets a part of the display screen corresponding to a position indicated by a barrier position information (which is equivalent to an information that defines a position to display a three-dimensional image) to a state for a user to selectively visually recognize a three-dimensional image. A display apparatus using the related art (which is referred to hereinafter as "display apparatus according to the related art" in some cases) achieves partial stereoscopic vision on a display screen based on a barrier position information transmitted from an external apparatus or a barrier position information generated according to a change in video. Therefore, the display apparatus according to the related art does not set a part to display a two-dimensional image to a state for visually recognizing a three-dimensional image and thus enables a user to visually recognize a two-dimensional image with no moiré, thereby having a possibility to attain improvement in image quality.

The barrier position information that is used for processing in the display apparatus according to the related art is an information that is transmitted from an external apparatus in addition to an image signal indicating an image to be displayed on the display screen or an information that is generated by the display apparatus according to the related art based on the image signal. Therefore, it is necessary to synchronize the barrier position information and the image signal in order to set a part of the display screen to a state for a user to selectively visually recognize a three-dimensional image by using the related art.

However, in the related art, no mechanism for synchronization is provided. Therefore, in the event of delay in processing of either one of the barrier position information or the image signal, for example, there is a possibility that the display apparatus according to the related art sets a part to display a two-dimensional image to a state for a user to visually recognize a three-dimensional image. Further, in the case of setting a part to display a two-dimensional image to a state for a user to visually recognize a three-dimensional image as described above, an event occurs that leads to degradation of image quality, such as a decrease in resolution, for example.

Further, in the related art, in the case of displaying an image indicated by contents data stored in a storage medium on a display screen, for example, it is unable to synchronize the image signal based on the contents data and the barrier position information. Therefore, in the above case, an event that leads to degradation of image quality, such as a decrease in resolution, occurs as in the case where delay occurs in processing of either one of the barrier position information or the image signal.

Thus, even with use of the related art, it is not achievable to enhance image quality when displaying an image containing both a two-dimensional image and a three-dimensional image on a display screen.

In light of the foregoing, it is desirable to provide a novel and improved image signal processing apparatus, an image signal processing method, a program, and an image signal processing system that can enhance image quality when displaying an image containing both a two-dimensional image and a three-dimensional image on a display screen.

According to an embodiment of the present invention, there is provided an image signal processing apparatus including a receiving unit that receives a display signal including an image signal containing both a two-dimensional image and a three-dimensional image and a region information defining in a predetermined unit a first region to display the two-dimensional image and a second region to display the three-dimensional image when displaying the image indicated by the image signal, and separates the image signal and the region information from the received display signal, a display control unit that generates a first display control information for controlling rendering positions of the first region and the second region in the image signal according to the region information and a second display control information for selectively displaying a three-dimensional image in a region corresponding to the rendering position of the second region on the display screen based on the region information separated by the receiving unit, and a processing unit that generates a display image signal indicating where the first region and the second region are arranged according to the first display control information generated by the display control unit and the image signal separated by the receiving unit.

Such arrangements enable enhancing image quality when displaying an image containing both a two-dimensional image and a three-dimensional image on a display screen.

The region information may include an information defining a sequence of processing and an information defining display processing when making superimposition on a previously processed region. The display control unit may generate the first display control information defining display processing for each region based on the region information, and the processing unit may generate the display image signal indicating where display processing based on the first display control information is performed for each region.

The image signal processing apparatus may further include a display unit that displays an image corresponding to the display image signal on a display screen, and selectively displays a three-dimensional image in a region corresponding to the rendering position of the second region on the display screen based on the second display control information.

According to another embodiment of the present invention, there is provided an image signal processing method including the steps of receiving a display signal including an image signal containing both a two-dimensional image and a three-dimensional image and a region information defining in a predetermined unit a first region to display the two-dimensional image and a second region to display the three-dimensional image when displaying the image indicated by the image signal on a display screen, and separating the image signal and the region information from the received display signal, generating a first display control information for controlling rendering positions of the first region and the second region in the image signal according to the region information and a second display control information for selectively displaying a three-dimensional image in a region corresponding to the rendering position of the second region on the display screen based on the region information separated in the separating step, and generating a display image signal indicating where the first region and the second region are arranged according to the first display control information generated in the generating step and the image signal separated in the separating step.

By use of such a method, it is possible to enhance image quality when displaying an image containing both a two-dimensional image and a three-dimensional image on a display screen.

According to another embodiment of the present invention, there is provided a program causing a computer to execute a process including the steps of receiving a display signal including an image signal containing both a two-dimensional image and a three-dimensional image and a region information defining in a predetermined unit a first region to display the two-dimensional image and a second region to display the three-dimensional image when displaying the image indicated by the image signal, and separating the image signal and the region information from the received display signal, generating a first display control information for controlling rendering positions of the first region and the second region in the image signal according to the region information and a second display control information for selectively displaying a three-dimensional image in a region corresponding to the rendering position of the second region on the display screen based on the region information separated in the separating step, and generating a display image signal indicating where the first region and the second region are arranged according to the first display control information generated in the generating step and the image signal separated in the separating step.

By use of such a program, it is possible to enhance image quality when displaying an image containing both a two-dimensional image and a three-dimensional image on a display screen.

According to another embodiment of the present invention, there is provided an image signal processing system including a transmitting apparatus that transmits a display signal including an image signal containing both a two-dimensional image and a three-dimensional image and a region information defining in a predetermined unit a first region to display the two-dimensional image and a second region to display the three-dimensional image when displaying the image indicated by the image signal, and an image signal processing apparatus including a receiving unit that receives the display signal transmitted from the transmitting apparatus and separates the image signal and the region information from the received display signal, a display control unit that generates a first display control information for controlling rendering positions of the first region and the second region in the image signal according to the region information and a second display control information for selectively displaying a three-dimensional image in a region corresponding to the rendering position of the second region on the display screen based on the region information separated by the receiving unit, and a processing unit that generates a display image signal indicating where the first region and the second region are arranged according to the first display control information generated by the display control unit and the image signal separated by the receiving unit.

Such arrangements provide an image signal processing system operable to enhance image quality when displaying an image containing both a two-dimensional image and a three-dimensional image on a display screen.

According to the embodiments of the present invention described above, it is possible to enhance image quality when displaying an image containing both a two-dimensional image and a three-dimensional image on a display screen.

BRIEF DESCRIPTION OF THE DRAWINGS

FIG. 11 is an explanatory view showing an example of a first display control information generated by an image signal processing apparatus according to an embodiment of the present invention.

DETAILED DESCRIPTION OF THE EMBODIMENT(S)

Figure 1:
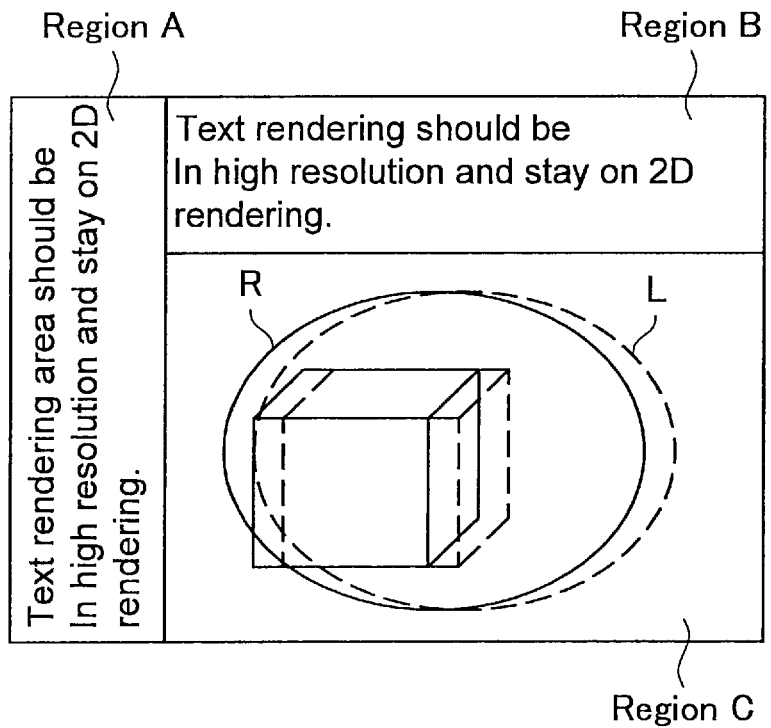
FIG. 1 is an explanatory view showing an example of an image to be displayed on a display screen by an image signal processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

1. Approach According to Embodiment of Present Invention
2. Image Signal Processing System According to Embodiment of Present Invention
3. Program According to Embodiment of Present Invention
(Approach According to Embodiment of Present Invention)

Prior to describing a configuration of each apparatus that constitutes an image signal processing system according to an embodiment of the present invention (which is referred to hereinafter as "image signal processing system 1000" in some cases), an approach to enhance image quality according to an embodiment of the present invention is described.

[Overview of Approach to Enhance Image Quality]

As described above, in the case of using the related art, it is difficult to synchronize an image signal indicating an image to be displayed on a display screen and an information defining a position to display a three-dimensional image (the barrier position information in the related art), and there is a possibility that an event that leads to degradation of image quality, such as a decrease in resolution, occurs.

In view of the above, in the image signal processing system 1000, an image signal processing apparatus according to an embodiment of the present invention (which is referred to hereinafter as "image signal processing apparatus 100" in some cases) processes a display signal that includes an image signal indicating an image containing both a two-dimensional image and a three-dimensional image and a region information for each of predetermined units in the image signal.

The display signal according to an embodiment of the present invention may be a digital signal such as a bit-stream signal, for example. In the above case, the display signal according to an embodiment of the present invention is a signal that includes an image signal and a region information in a bit-stream. Further, an image indicated by the image signal according to an embodiment of the present invention may be a moving image (two-dimensional image/three-dimensional image) or a still image (two-dimensional image/three-dimensional image). Note that the display signal may include an audio signal related to sound corresponding to an image indicated by the image signal, for example, and the image signal processing apparatus 100 may process the audio signal. Explanation of processing related to the audio signal in the image signal processing apparatus 100 is omitted below.

Further, the image signal processing apparatus 100 processes a display signal transmitted from a transmitting apparatus according to an embodiment of the present invention (which is referred to hereinafter as "transmitting apparatus 200" in some cases) that constitutes the image signal processing system 1000, for example, though not limited thereto. For example, the image signal processing apparatus 100 may process contents data corresponding to a display signal transmitted from the transmitting apparatus 200, which is stored in a storage unit (which is described later).

Furthermore, the region information according to an embodiment of the present invention is an information that defines a first region to display the two-dimensional image and a second region to display the three-dimensional image when displaying an image indicated by the image signal on a display screen. A specific example of the region information according to an embodiment of the present invention is described later.

Further, the predetermined unit in the image signal according to an embodiment of the present invention is a time-completion unit in the image signal, for example. The predetermined unit in the image signal according to an embodiment of the present invention may be each frame, one image unit in the interlace mode, one image unit in the progressive mode or the like, although not limited thereto. For example, the predetermined unit in the image signal according to an embodiment of the present invention is may be a plurality of frames.

The region information according to an embodiment of the present invention may be included in the display signal with respect to each predetermined unit in the image signal or may be selectively included when a change occurs in the contents of an image indicated by the image signal. The display signal is generated in the transmitting apparatus 200, for example.

The overview of the approach to enhance image quality is described more specifically hereinbelow. The image signal processing apparatus 100 separates an image signal and a region information from a display signal to be processed, and generates a first display control information and a second display control information based on the region information. Then, the image signal processing apparatus 100 generates a display image signal indicating an image in which the first region and the second region are arranged according to the first display control information based on the first display control information, and selectively displays a three-dimensional image in a region which corresponds to a rendering position of the second region on a display screen based on the second display control information.

The first display control information according to an embodiment of the present invention is an information (data) that controls rendering positions of the first region and the second region in the image signal (the image signal corresponding to a predetermined unit in the image signal) corresponding to the region information. The first display control information may be an information that defines region start coordinates in the horizontal direction, region end coordinates in the horizontal direction, region start coordinates in the vertical direction, and region end coordinates in the vertical direction on a display screen with respect to each of the first region and the second region, for example. An example of the first display control information is described later.

The image signal processing apparatus 100 can specify the position of the first region and the position of the second region by the first display control information as described above.

Further, the second display control information according to an embodiment of the present invention is an information for selectively displaying a three-dimensional image in a region which corresponds to the rendering position of the second region in the display screen. The second display control information may be an information that specifies a part to apply a voltage in a display device, for example, though not limited thereto. The information that specifies a part to apply a voltage in a display device may be an information that directly/indirectly specifies the address of an electrode to apply a voltage, for example.

FIG. 1 is an explanatory view showing an example of an image to be displayed on a display screen by the image signal processing apparatus 100 according to an embodiment of the present invention, and it shows an example of an image to be displayed on the display screen according to the display image signal generated by the image signal processing apparatus 100. "Region A" and "Region B" shown in FIG. 1 correspond to the first region (which is the region where a two-dimensional image is displayed), and "Region C" shown in FIG. 1 corresponds to the second region (which is the region where a three-dimensional image is displayed). Further, "L" shown in FIG. 1 indicates an image corresponding to a left-eye image signal, and "R" shown in FIG. 1 indicates an image corresponding to a right-eye image signal.

Figure 2A:
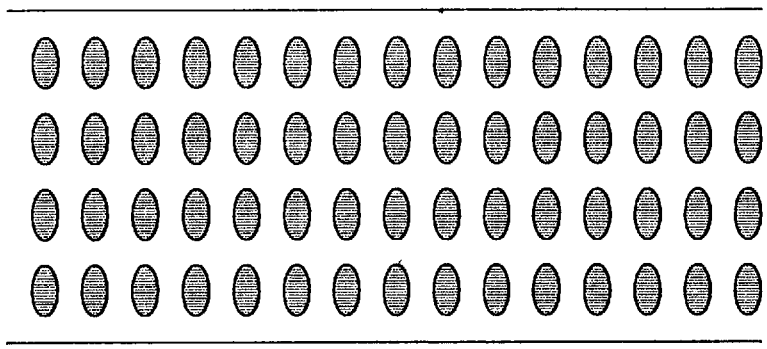
FIG. 2A is an explanatory view showing an example of a structure to make a user selectively visually recognize a three-dimensional image according to an embodiment of the present invention.
Figure 2B:
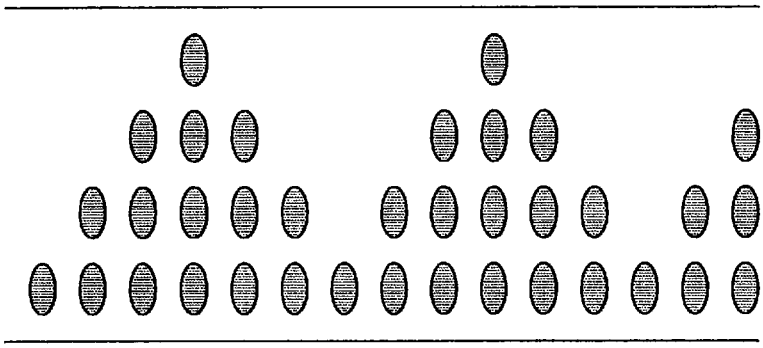
FIG. 2B is an explanatory view showing an example of a structure to make a user selectively visually recognize a three-dimensional image according to an embodiment of the present invention.

FIGS. 2A and 2B are explanatory views showing an example of a structure to make a user selectively visually recognize a three-dimensional image according to an embodiment of the present invention. FIG. 2A shows the state of liquid crystals in a liquid crystal device (an example of a display device) before application of a voltage based on the second display control information generated by the image signal processing apparatus 100. FIG. 2B shows the state of liquid crystals in the liquid crystal device after application of a voltage based on the second display control information generated by the image signal processing apparatus 100, and it shows the state where a cylindrical lens is formed according to the voltage.

As shown in FIGS. 2A and 2B, the structure to make a user selectively visually recognize a three-dimensional image according to an embodiment of the present invention may be a structure that varies the state of liquid crystals by selectively applying a voltage to a liquid crystal display device and thereby selectively forms a cylindrical lens, for example. Note that the structure to make a user selectively visually recognize a three-dimensional image according to an embodiment of the present invention is not limited thereto. For example, in an embodiment of the present invention, a structure that selectively controls a parallax barrier based on the second display control information generated by the image signal processing apparatus 100 may be employed. Hereinafter, a structure that selectively forms a cylindrical lens based on the second display control information generated by the image signal processing apparatus 100 is described by way of illustration.

The image signal processing apparatus 100 generates a display image signal indicating an image containing both a two-dimensional image and a three-dimensional image as shown in FIG. 1 based on the first display control information generated on the basis of a region information, and transmits the display image signal to a display device constituting a display screen. Further, the image signal processing apparatus 100 generates a second display control information that selectively sets the state of liquid crystals in a region corresponding to the second region (e.g. Region C in FIG. 1) on the display screen to the state shown in FIG. 2B and transmits the second display control information to the display device.

The image signal processing apparatus 100 performs processing by separating an image signal and a region information from a display signal that includes the image signal and the region information. Therefore, with use of information of a time stamp which is set to the image signal or the like, for example, the image signal processing apparatus 100 can synchronize the image signal and the region information without incorporating any particular mechanism for associating the image signal and the region information. Further, the image signal processing apparatus 100 can synchronize the image signal and the region information in the same manner as above in the case of displaying an image indicated by contents data corresponding to the display signal which is stored in a storage medium on the display screen as well.

Thus, in the image signal processing system 1000 that includes the image signal processing apparatus 100, because synchronization between the image signal and the region information defining the first region and the second region can be achieved, there is no possibility that an event that leads to degradation of image quality, such as a decrease in resolution, occurs as in the case of using the related art. Further, in the image signal processing system 1000 that includes the image signal processing apparatus 100, because a three-dimensional image is displayed in the part where a cylindrical lens is formed, there is no decrease in the resolution of a two-dimensional image. Therefore, the image signal processing apparatus 100 can enhance image quality when displaying an image containing both a two-dimensional image and a three-dimensional image on a display screen.

Figure 3:
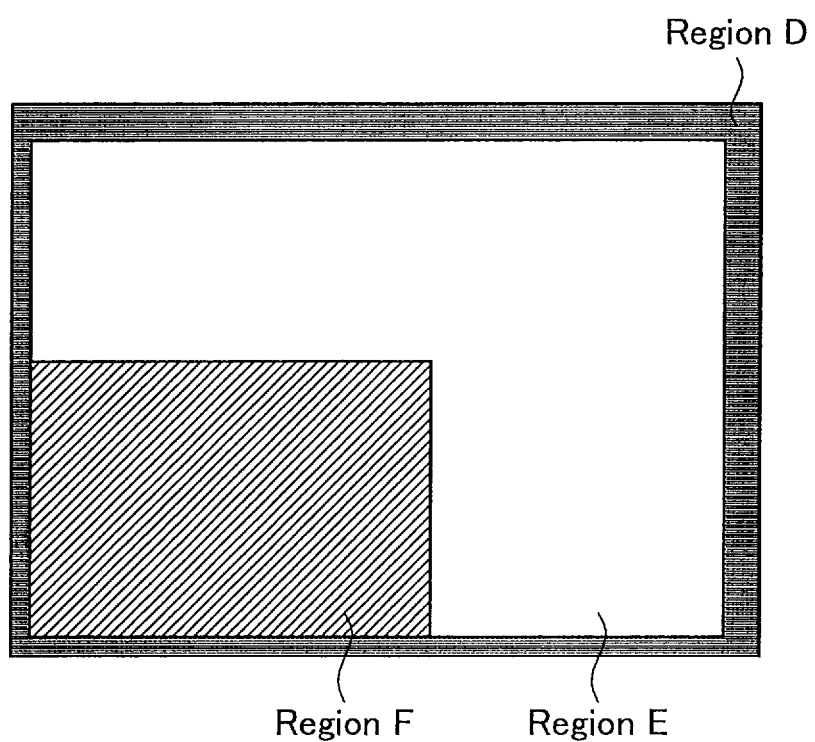
FIG. 3 is an explanatory view showing another example of an image to be displayed on a display screen by an image signal processing apparatus according to an embodiment of the present invention.
Figure 4:
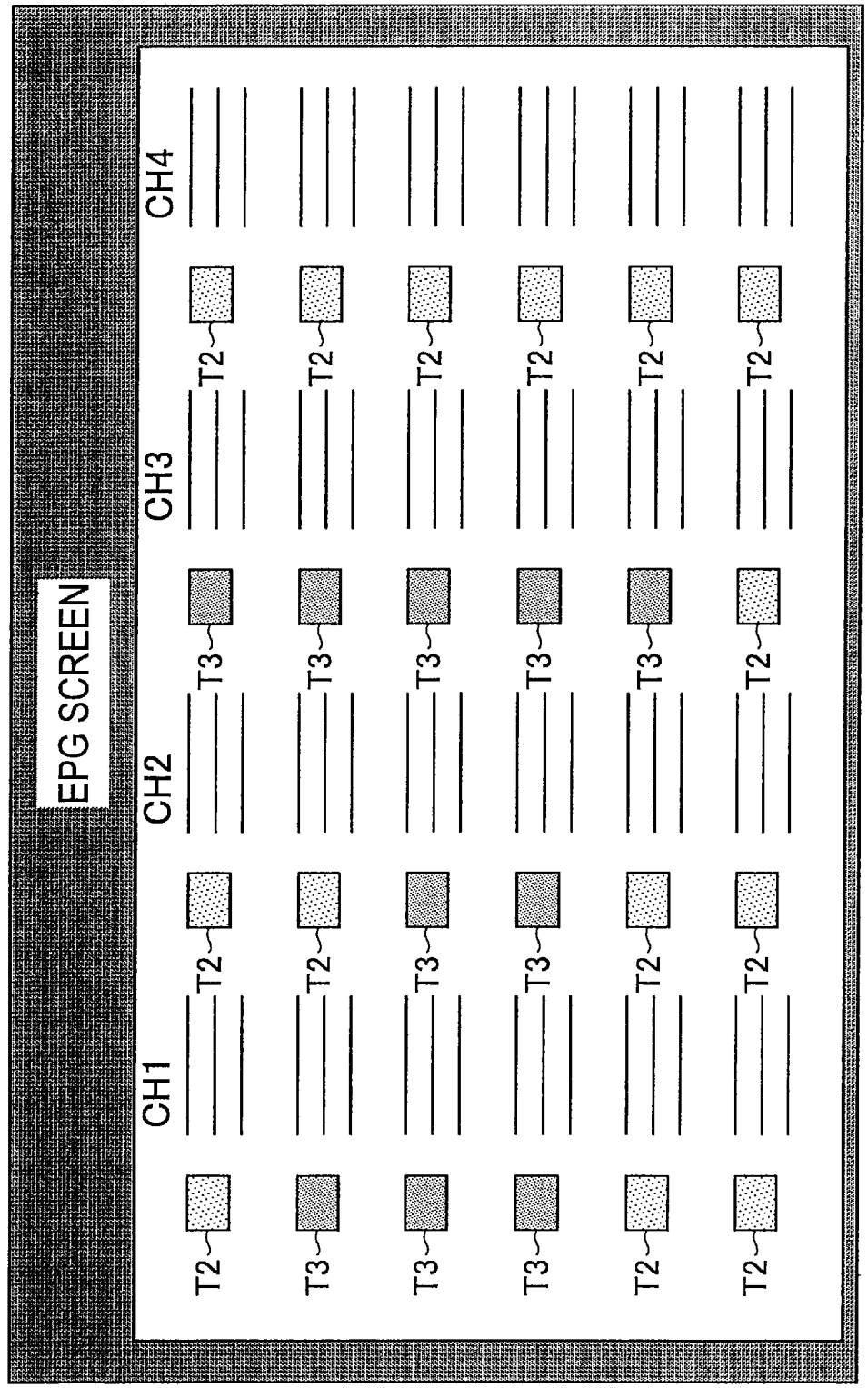
FIG. 4 is an explanatory view showing another example of an image to be displayed on a display screen by an image signal processing apparatus according to an embodiment of the present invention.

It should be noted that an image containing both a two-dimensional image and a three-dimensional image which is indicated by the display image signal generated by the image signal processing apparatus 100 is not limited to the example shown in FIG. 1. FIGS. 3 and 4 are explanatory views showing other examples of an image to be displayed on a display screen by the image signal processing apparatus according to an embodiment of the present invention. As shown in FIG. 3, the image signal processing apparatus 100 can generate a display image signal indicating an image where a plurality of regions (Region D to Region F shown in FIG. 3) overlap with one another. Further, as shown in FIG. 4, the image signal processing apparatus 100 can generate a display image signal indicating a thumbnail screen when displaying a program guide such as EPG (Electronic Program Guide). In FIG. 4, "T2" indicates a 2D thumbnail, and "T3" indicates a 3D thumbnail.

[Example of Processing Related to Approach to Enhance Image Quality]

An example of processing related to the approach to enhance image quality according to an embodiment of the present invention in the image signal processing apparatus 100 is described next. An example of processing related to the approach to enhance image quality according to an embodiment of the present invention can be regarded as an example of an image signal processing method according to an embodiment of the present invention.

As described above, the image signal processing apparatus 100 separates an image signal and a region information from a display signal and performs processing based on the image signal and the region information separated from the display signal.

Figure 5:
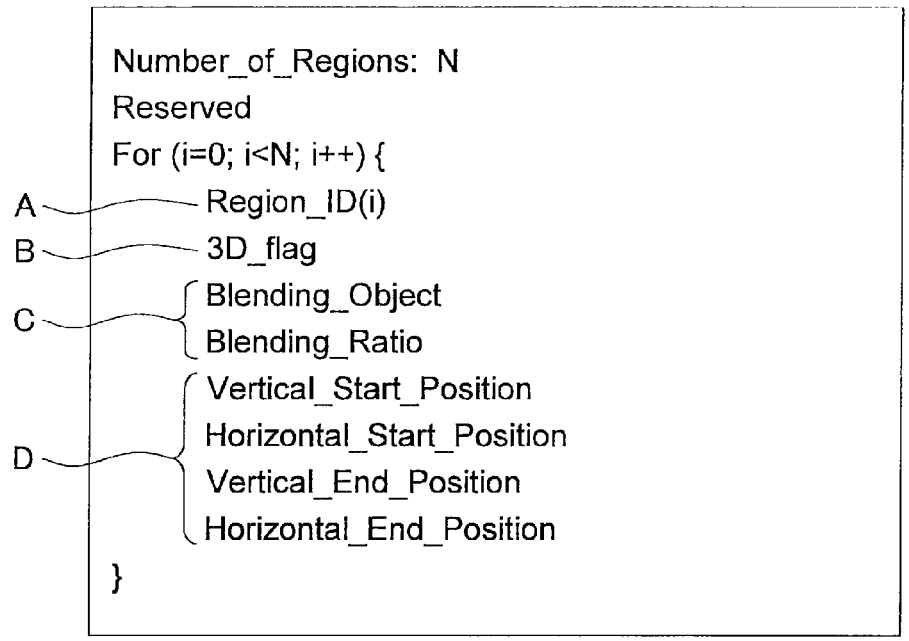
FIG. 5 is an explanatory view showing an example of a region information according to an embodiment of the present invention.

FIG. 5 is an explanatory view showing an example of a region information according to an embodiment of the present invention. A region information according to an embodiment of the present invention includes an information that identifies a region (A in FIG. 5), a flag that indicates the type of a region (B in FIG. 5), an information that defines processing when making superimposition on another region (C in FIG. 5), and an information that defines the position of a region (D in FIG. 5), for example.

The information that identifies a region shown in A in FIG. 5 indicates ID of a region that uniquely identifies a region which the image signal processing apparatus 100 places. Further, because the image signal processing apparatus 100 performs processing in ascending order of the number as ID, for example, the information that identifies a region shown in A in FIG. 5 can be regarded as an information that defines the order of processing by the image signal processing apparatus 100.

Further, the flag shown in B in FIG. 5 indicates whether the region identified by the information identifying a region shown in A in FIG. 5 is the first region (the region to display the two-dimensional image) or the second region (the region to display the three-dimensional image). The flag indicates the first region when it is "0" and indicates the second region when it is "1", for example, though not limited thereto. In the following, the case where the flag shown in B in FIG. 5 indicates the first region when it is "0" and indicates the second region when it is "1" is described by way of illustration.

Further, the information that defines processing when making superimposition on another region shown in C in FIG. 5 defines processing to be performed when regions overlap with one another as shown in FIG. 3, for example. For example, "Blending_Object" shown in FIG. 5 specifies another region that overlaps in units of pixels during display on a display screen. Further, "Blending_Ratio" shown in FIG. 5 defines processing when overlapping with another region.

Processing defined by "Blending_Ratio" shown in FIG. 5 may be overwriting another region when the value of "Blending_Ratio" is "0", for example. Further, processing defined by "Blending_Ratio" may be superimposing a region identified by the information identifying a region shown in A in FIG. 5 in a transparent state when the value of "Blending_Ratio" is "7" (which is an example of a maximum value), for example. The image signal processing apparatus 100 can uniquely determine a blending ratio of a region identified by the information identifying a region shown in A in FIG. 5 and another region by using the value of "Blending_Ratio" shown in FIG. 5, for example.

Note that processing defined by the information defining processing when making superimposition on another region according to an embodiment of the present invention is not limited to processing that blends a region identified by the information identifying a region shown in A in FIG. 5 and another region as a matter of course. Further, the information that defines processing when making superimposition on another region according to an embodiment of the present invention can be regarded as an information that defines display processing when making superimposition on a previously processed region.

Further, the information that defines the position of a region shown in D in FIG. 5 defines region start coordinates in the horizontal direction ("Horizontal_Start_Position" in FIG. 5), region end coordinates in the horizontal direction ("Horizontal_End_Position" in FIG. 5), region start coordinates in the vertical direction ("Vertical_Start_Position" in FIG. 5), and region end coordinates in the vertical direction ("Vertical_End_Position" in FIG. 5) on a display screen in the region identified by the information identifying a region shown in A in FIG. 5.

The image signal processing apparatus 100 generates the first display control information and the second display control information for each region included in the region information based on the respective information of each region included in the region information shown in FIG. 5, for example. Note that the image signal processing apparatus 100 may use the respective information of each region included in the region information themselves as the first display control information and the second display control information of the region.

The image signal processing apparatus 100 generates the display image signal indicating an image where the first region and the second region are arranged based on the first display control information generated on the basis of the region information shown in FIG. 5, for example, and the image signal according to the region information.

Note that the region information according to an embodiment of the present invention is not limited to the example shown in FIG. 5. For example, the region information according to an embodiment of the present invention may further include an information to control activation or inactivation of display control for each region (the first region or the second region) in the image signal processing apparatus 100 with respect to each region.

Figure 6:
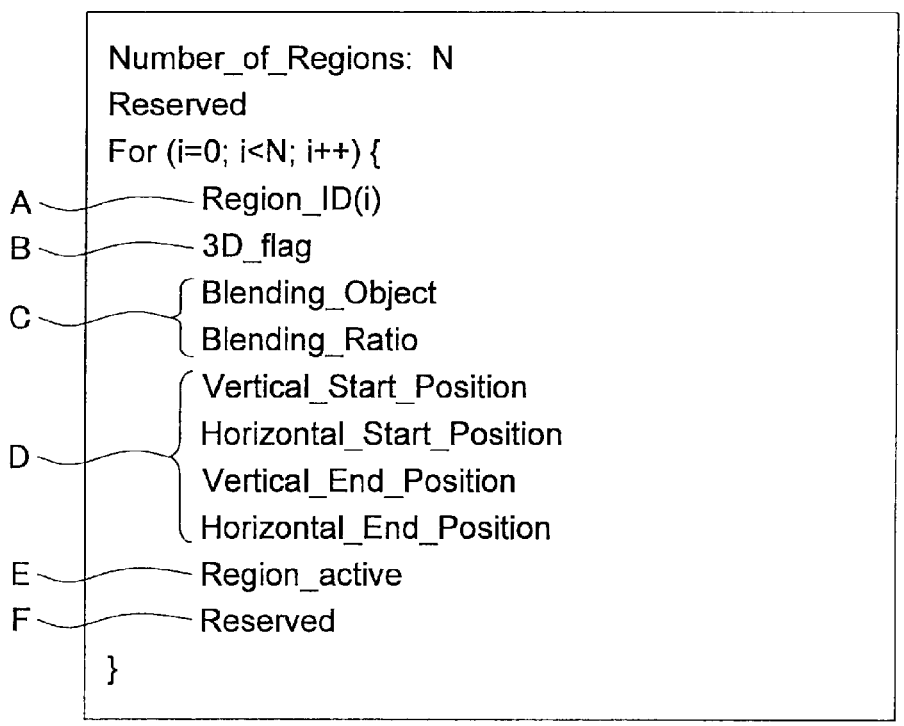
FIG. 6 is an explanatory view showing another example of a region information according to an embodiment of the present invention.

FIG. 6 is an explanatory view showing another example of a region information according to an embodiment of the present invention. Referring to FIG. 6, a region information according to another example includes an information to control activation or inactivation of display control for each region (E in FIG. 6) and a reserved data region for further including other information (F in FIG. 6), in addition to the respective information shown with reference to A to D of FIG. 5, for example. "Region active" shown in E of FIG. 6 indicates inactivation of display control for a region when its value is "0" and indicates activation of display control for a region when its value is "1", for example, though not limited thereto.

The image signal processing apparatus 100 generates the first display control information and the second display control information with respect to each region included in the region information based on the respective information (A to D in FIG. 6) of each region included in the region information shown in FIG. 6, for example, in the same manner as the case of using the region information shown in FIG. 5. Further, the image signal processing apparatus 100 controls display control for each region based on the information indicated by E in FIG. 6, for example. The information indicated by E in FIG. 6 is hereinafter referred to as "third display control information" in some cases.

Further, the image signal processing apparatus 100 preholds a processing system until a change occurs in the respective information included in the received region information, for example. Specifically, even when the region information is not included for each predetermined unit in the image signal, for example, the image signal processing apparatus 100 can perform processing based on the previously received region information.

Accordingly, in the above case, the image signal processing system 1000 can enhance image quality even in the case where the transmitting apparatus 200 transmits the region information shown in FIG. 6 each time a change occurs in the image indicated by the image signal to be transmitted, not with respect to each predetermined unit in the image signal, for example. Further, in the above case, it is not necessary in the image signal processing system 1000 to transmit the region information for each predetermined unit in the image signal, and it is thereby possible to achieve more efficient transmission of the region information.

The image signal processing apparatus 100 generates the display image signal indicating an image in which the first region and the second region are arranged based on the first display control information generated on the basis of the region information shown in FIG. 5 or 6, for example, and the image signal according to the region information. Note that the region information according to an embodiment of the present invention is not limited to the example shown in FIG. 5 or 6 as a matter of course.

Figure 7A:
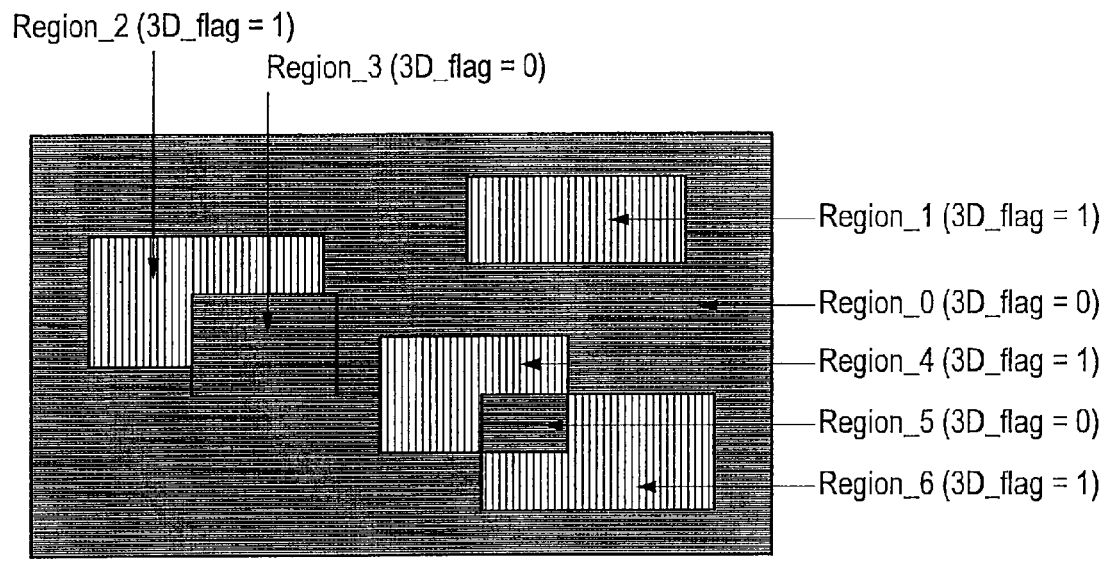
FIG. 7A is an explanatory view showing an example of an image indicated by a display image signal generated by an image signal processing apparatus according to an embodiment of the present invention.
Figure 7B:
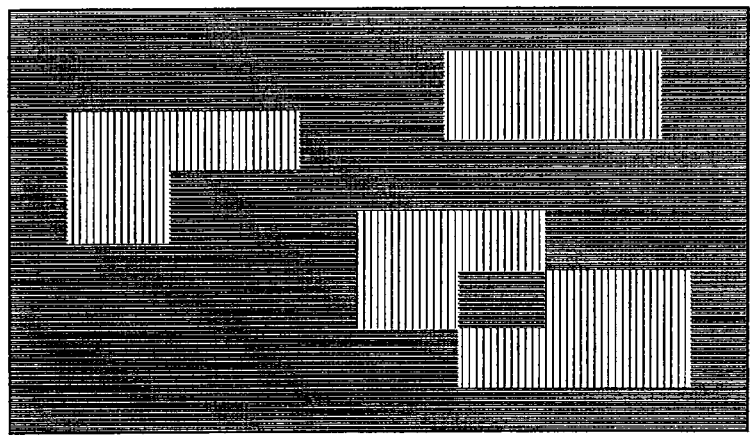
FIG. 7B is an explanatory view showing an example of an image indicated by a display image signal generated by an image signal processing apparatus according to an embodiment of the present invention.

FIGS. 7A and 7B are explanatory views showing examples of an image indicated by the display image signal generated by the image signal processing apparatus 100 according to an embodiment of the present invention. FIG. 7A is an explanatory view to describe a generation process of an image indicated by the display image signal in the image signal processing apparatus 100, and FIG. 7B shows an example of an image indicated by the display image signal corresponding to FIG. 7A which is generated by the image signal processing apparatus 100.

As shown in FIG. 7A, the image signal processing apparatus 100 generates the display image signal indicating an image where regions are arranged in ascending order of the value of N of a region with respect to each Region_(N) (N is an integer of 0 or greater). As a result, the image indicated by the display image signal generated by the image signal processing apparatus 100 is an image containing both a two-dimensional image and a three-dimensional image as shown in FIG. 7B.

The image signal processing apparatus 100 generates a display image signal based on an image signal and a region information separated from a display signal and a second display control information based on the region information, and transmits the display image signal and the second display control information to a display device. Therefore, the display device that has received the display image signal and the second display control information can display an image containing both a two-dimensional image and a three-dimensional image on its display screen and further selectively display a three-dimensional image in the region to display the three-dimensional image.

The display device according to an embodiment of the present invention may be included in the image signal processing apparatus 100, for example, though not limited thereto. For example, the image signal processing apparatus 100 may transmit the display image signal and the second display control information to the display device as an external apparatus through a connection interface such as HDMI (High-Definition Multimedia Interface).

The image signal processing apparatus 100 can achieve the approach to enhance image quality according to an embodiment of the present invention by performing the above-described processing, for example. Therefore, the image signal processing apparatus 100 can enhance image quality when displaying an image containing both a two-dimensional image and a three-dimensional image on a display screen by performing the above-described processing, for example.

(Image Signal Processing System According to Embodiment of Present Invention)

Figure 8:
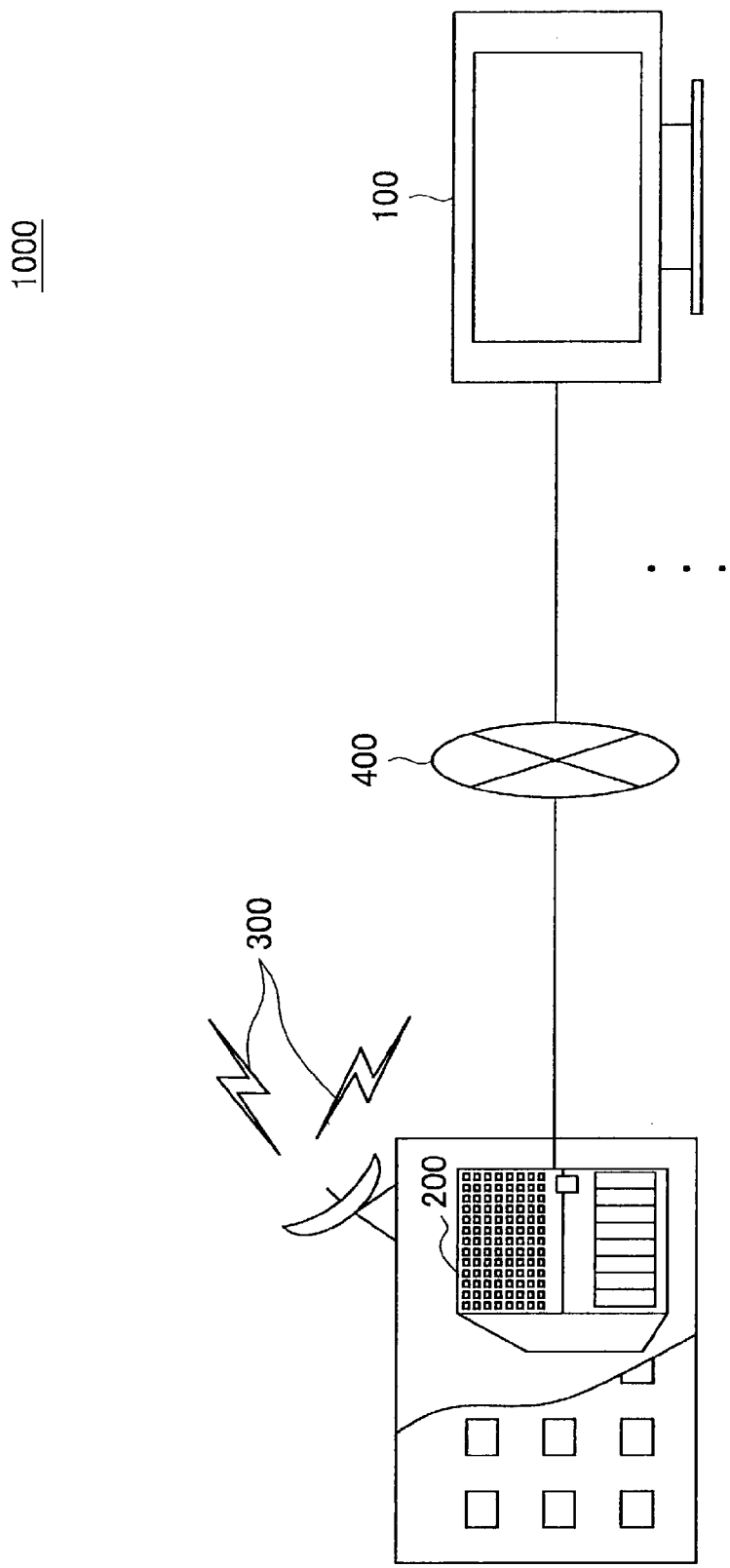
FIG. 8 is an explanatory view to explain an overview of an image signal processing system according to an embodiment of the present invention.

An exemplary configuration of the image signal processing system 1000 that can achieve the approach to enhance image quality according to an embodiment of the present invention described above is described hereinbelow. FIG. 8 is an explanatory view to explain an overview of the image signal processing system 1000 according to an embodiment of the present invention.

Referring to FIG. 8, the image signal processing system 1000 includes the transmitting apparatus 200 and the image signal processing apparatus 100 and so on. Although one image signal processing apparatus 100 is shown in FIG. 8, the number of image signal processing apparatus in the image signal processing system 1000 is not limited to one. Note that the configuration of the image signal processing apparatus in the image signal processing system 1000 can be basically similar to that of the image signal processing apparatus 100 shown in FIG. 8, and is thus not redundantly described.

FIG. 8 shows a television set that (directly/indirectly) can receive a broadcast wave 300 on which a display signal is superimposed and which is transmitted from the transmitting apparatus 200 through a television tower or the like and display an image (moving image/still image) based on an image signal included in the received display signal as the image signal processing apparatus 100, though not limited thereto.

The direct reception of the display signal superimposed on the broadcast wave 300 means that the image signal processing apparatus 100 receives the broadcast wave 300, for example. On the other hand, the indirect reception of the display signal superimposed on the broadcast wave 300 means that the image signal processing apparatus 100 receives the display signal transmitted from an external antenna that has received the broadcast wave 300, for example.

Further, the transmitting apparatus 200 and the image signal processing apparatus 100 are connected via a network 400 (or directly), and the image signal processing apparatus 100 can receive the display signal transmitted from the transmitting apparatus 200 via the network 400.

The network 400 may be a wired network such as LAN (Local Area Network) or WAN (Wide Area Network), a wireless network such as WWAN (Wireless Wide Area Network) or WMAN (Wireless Metropolitan Area Network) through a base station, Internet using a communication protocol such as TCP/IP (Transmission Control Protocol/Internet Protocol) or the like, for example, though not limited thereto.

Although FIG. 8 shows the case where the transmitting apparatus 200 performs both transmission of the display signal through the broadcast wave 300 and transmission of the display signal via the network 400, it is not limited thereto. The transmitting apparatus 200 according to an embodiment of the present invention can perform transmission of the display signal through the broadcast wave 300 and/or transmission of the display signal via the network 400.

[Image Signal Processing Apparatus 100]

Figure 9:
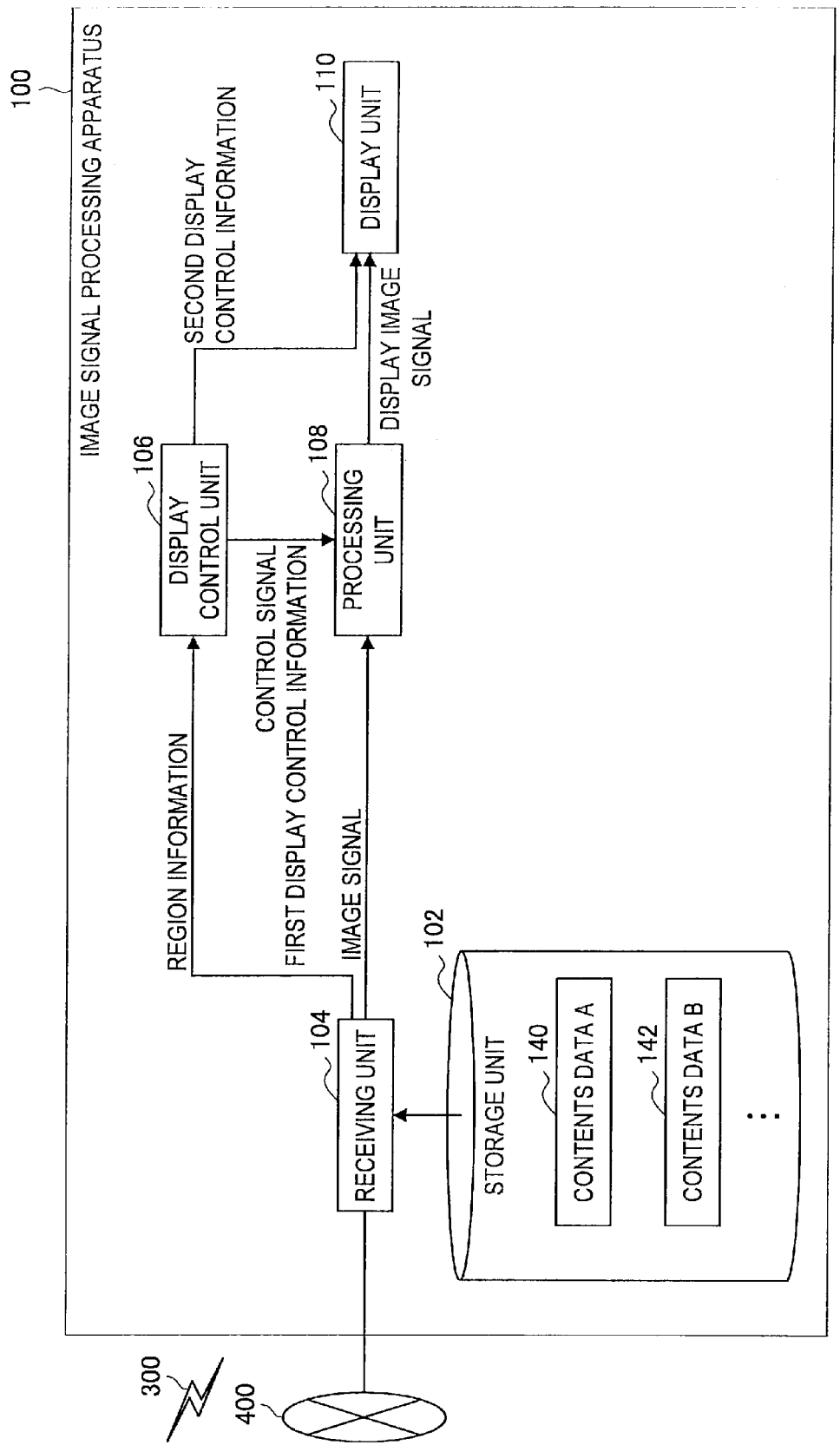
FIG. 9 is an explanatory view showing an example of a configuration of an image signal processing apparatus according to an embodiment of the present invention.

FIG. 9 is an explanatory view showing an example of a configuration of the image signal processing apparatus 100 according to an embodiment of the present invention.

The image signal processing apparatus 100 includes a storage unit 102, a receiving unit 104, a display control unit 106, a processing unit 108, and a display unit 110.

The image signal processing apparatus 100 may further include a control unit (not shown), ROM (Read Only Memory; not shown), RAM (Random Access Memory; not shown), an operating unit (not shown) that can be operated by a user of the image signal processing apparatus 100 or the like, for example. The image signal processing apparatus 100 connects among the above components though a bus as a data transmission line, for example.

The control unit (not shown) is composed of MPU (Micro Processing Unit), various kinds of processing circuits for implementing control functions or the like, for example, and controls the image signal processing apparatus 100 as a whole. Further, the control unit (not shown) may serve as the display control unit 106 and the processing unit 108, for example.

The ROM (not shown) stores control data such as a program or a calculation parameter to be used by the control unit (not shown). The RAM (not shown) temporarily stores the program or the like executed by the control unit (not shown).

The operating unit (not shown) may be a button, a direction key, or a rotating selector such as a jog dial, or a combination of those, for example, though not limited thereto. Further, the image signal processing apparatus 100 may be connected to an operation input device (e.g. a keyboard, a mouse etc.) as an external apparatus of the image signal processing apparatus 100 and perform processing in response to a user operation transmitted from the operation input device.

The storage unit 102 is a storage means included in the image signal processing apparatus 100. The storage unit 102 may be a magnetic recording medium such as a hard disk or nonvolatile memory such as EEPROM (Electrically Erasable and Programmable Read Only Memory), flash memory, MRAM (Magnetoresistive Random Access Memory), FeRAM (Ferroelectric Random Access Memory) or PRAM (Phase change Random Access Memory) or the like, though not limited thereto.

The storage unit 102 stores various kinds of data such as contents data corresponding to a received display signal, contents data not dependent on a received display signal or various applications. FIG. 9 shows the case where contents data A 140 and contents data B 142 corresponding to received display signals are stored in the storage unit 102, though not limited thereto.

The receiving unit 104 receives a display signal and separates an image signal and a region information from the display signal. Then, the receiving unit 104 transmits the separated image signal and region information to the corresponding components. Specifically, the receiving unit 104 transmits the region information to the display control unit 106 and transmits the image signal to the processing unit 108. Although not shown in FIG. 9, the receiving unit 104 can transmit an information of various kinds of time stamps such as a time stamp related to an image signal, a time stamp related to an audio signal or a time stamp related to the region information to the display control unit 106, for example.

[Exemplary Configuration of Receiving Unit 104]

Figure 10:
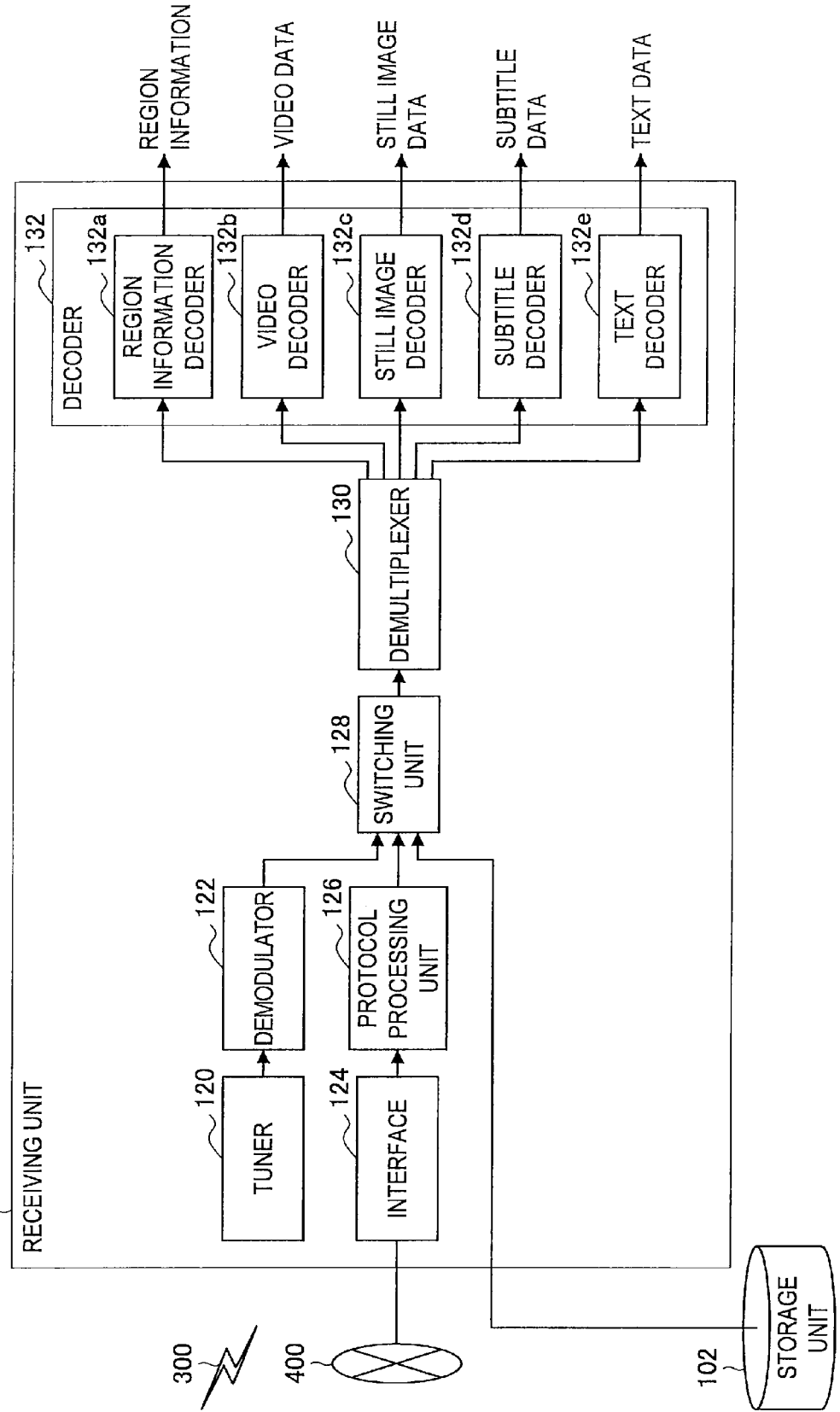
FIG. 10 is an explanatory view showing an example of a configuration of a receiving unit included in an image signal processing apparatus according to an embodiment of the present invention.

FIG. 10 is an explanatory view showing an example of a configuration of the receiving unit 104 included in the image signal processing apparatus 100 according to an embodiment of the present invention. FIG. 10 shows an example of a configuration in which the image signal processing apparatus 100 has a function of receiving a display signal through the broadcast wave 300, a function of receiving a display signal via the network 400, and a function of processing contents data stored in the storage unit 102.

The receiving unit 104 includes a tuner 120, a demodulator 122, an interface 124, a protocol processing unit 126, a switching unit 128, a demultiplexer 130, and a decoder 132.

The tuner 120 and the demodulator 122 serve to receive a display signal through the broadcast wave 300. Further, the interface 124 and the protocol processing unit 126 serve to receive a display signal via the network 400.

The display signal transmitted from the demodulator 122, the display signal transmitted from the protocol processing unit 126, or a signal corresponding contents data stored in the storage unit 102 are input to the switching unit 128, and the switching unit 128 selectively transmits any one of those signals to the demultiplexer 130. Hereinafter, the case where the switching unit 128 transmits the display signal to the demultiplexer 130 is described by way of illustration.

The switching unit 128 switches the display signal or the like to be output based on an operation signal corresponding to a user operation transmitted from the operating unit (not shown), for example, though not limited thereto.

The demultiplexer 130 separates an image signal and a region information from the display signal transmitted from the switching unit 128 and transmits the separated image signal and region information to the decoder 132. When the region information is not included in the display signal or the contents data, the demultiplexer 130 does not transmit the region information to the decoder 132.

The decoder 132 decodes the image signal and region information transmitted from the demultiplexer 130 and transmits the decoded image signal and region information to the corresponding components.

FIG. 10 shows a configuration in which the decoder 132 includes a region information decoder 132a, a video decoder 132b, a still image decoder 132c, a subtitle decoder 132d, and a text decoder 132e.

The region information decoder 132a decodes the region information and transmits the decoded region information to the display control unit 106. The video decoder 132b decodes a video (moving image) included in the image signal and transmits the decoded video data to the processing unit 108. The still image decoder 132c decodes a still image included in the image signal and transmits the decoded still image data to the processing unit 108. The subtitle decoder 132d decodes a subtitle part included in the image signal and transmits the decoded subtitle data to the processing unit 108. The text decoder 132e decodes a text part included in the image signal and transmits the decoded text data to the processing unit 108. The video data, the still image data, the subtitle data and the text data shown in FIG. 10 correspond to the image signal shown in FIG. 9.

As shown in FIG. 10, in the case where the region information is inserted as a multiplexed stream to the outside of a video coded stream, the image signal processing apparatus 100 can perform display control in synchronization with the display timing of a video based on the region information to which a display control time stamp similar to a display time stamp related to video data is added.

Note that the configuration of the decoder 132 shown in FIG. 10 shows some of functions of the decoder 132, and the configuration of the decoder 132 is not limited thereto. For example, in the case where the region information is inserted to a video stream, the decoder 132 may have a configuration in which the video decoder 132b transmits the region information to the display control unit 106 and transmits video data to the processing unit 108. The case where the region information is inserted to a video stream may be when the region information is inserted as a supplementary information of a video to the inside of a video coded stream at a picture header or a control layer equivalent to a picture header, for example. In the above case, display control in synchronization with the display timing of a video can be performed.

The receiving unit 104 can separate an image signal and a region information from a display signal and transmit the image signal and the region information to the corresponding components by the configuration shown in FIG. 10, for example. Note that the configuration of the receiving unit included in the image signal processing apparatus 100 according to an embodiment of the present invention is not limited to the configuration shown in FIG. 10 as a matter of course.

Referring back to FIG. 9, an example of the configuration of the image signal processing apparatus 100 is further described. The display control unit 106 generates a first display control information and a second display control information based on the region information transmitted from the receiving unit 104.

FIG. 11 is an explanatory view showing an example of the first display control information generated by the image signal processing apparatus 100 according to an embodiment of the present invention. The display control unit 106 generates the first display control information as shown in FIG. 11 based on the region information shown in FIG. 5, for example. FIG. 11 shows an example of the first display control information that includes an information identifying a region (G in FIG. 11), a flag indicating whether each region presents a two-dimensional image or a three-dimensional image (H in FIG. 11), and an information of a position where each region is placed (I in FIG. 11).

It should be noted that the first display control information according to an embodiment of the present invention is not limited to the example shown in FIG. 11 as a matter of course. For example, in the case where the region information transmitted from the receiving unit 104 includes "information that defines processing when making superimposition on another region" (e.g. C in FIG. 5), the display control unit 106 may generate the first display control information that includes a processing command (a processing command that defines display processing) for each region, which corresponds to the information that defines processing when making superimposition on another region.

Further, the display control unit 106 may use the respective information of each region included in the region information as the second display control information, though not limited thereto.

Furthermore, the display control unit 106 transmits the generated first display control information and a control signal to the processing unit 108. The control signal according to an embodiment of the present invention is a signal that controls the output timing of a display image signal to be output from the processing unit 108.

The display control unit 106 transmits the control signal to the processing unit 108 at the timing that enables the processing unit 108 to output the display image signal in synchronization with transmission of the second display control information to the display unit 110. The display control unit 106 compares an information of the time stamp transmitted from the receiving unit 104 with a reference clock generated by XO (X'tal Oscillator) or the like and transmits the control signal to the processing unit 108 when they match, for example, though not limited thereto. It is thereby possible in the image signal processing apparatus 100 to achieve synchronous transmission of the display image signal and the second display control information to the display unit 110. Note that a synchronous transmission method of the display image signal and the second display control information to the display unit 110 in the image signal processing apparatus 100 is not limited thereto.

Further, when the region information is not transmitted from the receiving unit 104 (when the second display control information is not generated), the display control unit 106 transmits the control signal to the processing unit 108 at the timing on the basis of the information of the time stamp set to the image signal, for example. The display control unit 106 performs processing by using the information of the time stamp transmitted from the receiving unit 104, for example, although not limited thereto. For example, the display control unit 106 may perform processing by using the information of the time stamp transmitted from the processing unit 108.

The display control unit 106 selectively transmits the control signal to the processing unit 108 as described above, for example, and thereby controls the output timing of the display image signal to be output from the processing unit 108.

Further, when the region information including an information to control activation or inactivation of display control for a region with respect to each region (information indicated by E in FIG. 6) is transmitted from the receiving unit 104 as shown in FIG. 6, the display control unit 106 transmits the third display control information to the processing unit 108. Further, when no region information is transmitted from the receiving unit 104 after the region information shown in FIG. 6 is transmitted from the receiving unit 104, the display control unit 106 performs processing based on the previously transmitted region information. Specifically, in the above case, the display control unit 106 transmits the first display control information based on the previously transmitted region information to the processing unit 108 in synchronization with transmission of the control signal and transmits the second display control information based on the previously transmitted region information to the display unit 110, for example.

The display control unit 106 is composed of a CPU (Central Processing Unit) that generates a control signal based on a time stamp information and a reference clock, a rendering controller having the above function or the like, for example, although not limited thereto. For example, in the image signal processing apparatus 100, the control unit (not shown) may serve as the display control unit 106.

The processing unit 108 generates a display image signal based on the image signal transmitted from the receiving unit 104 and the first display control information transmitted from the display control unit 106. Further, the processing unit 108 transmits the generated display image signal to the display unit 110 based on the control signal transmitted from the display control unit 106.

Exemplary Configuration of Processing Unit 108

[1] First Example

Figure 12:
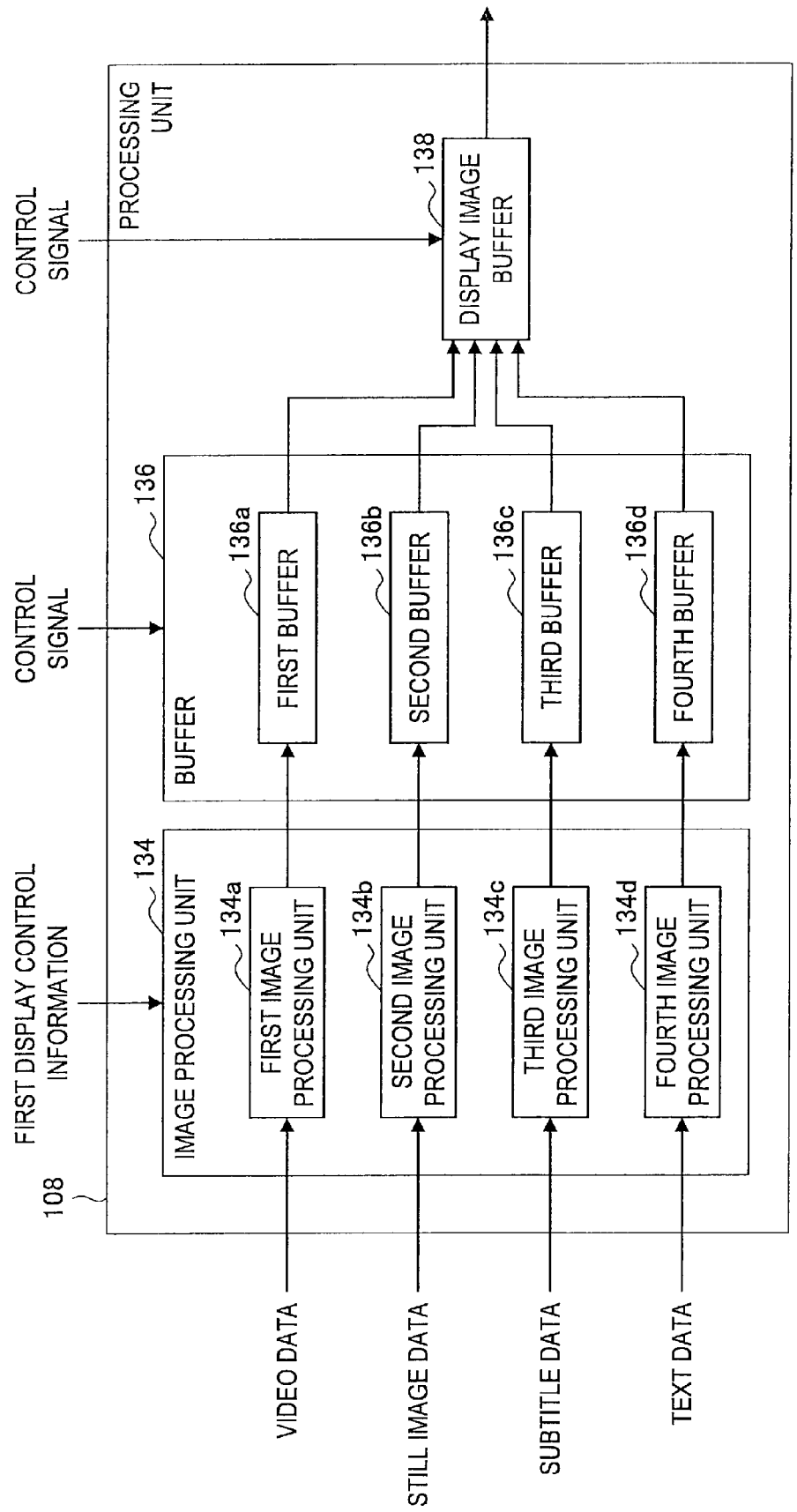
FIG. 12 is an explanatory view showing an example of a configuration of a processing unit included in an image signal processing apparatus according to an embodiment of the present invention.

FIG. 12 is an explanatory view showing an example of a configuration of the processing unit 108 included in the image signal processing apparatus 100 according to an embodiment of the present invention. FIG. 12 shows video data, still image data, subtitle data and text data that are output from the decoder 132 shown in FIG. 10, as an example of the image signal transmitted from the receiving unit 104. Note that the image signal transmitted from the receiving unit 104 is not limited to video data, still image data, subtitle data and text data as a matter of course. Hereinafter, the case where the image signal transmitted from the receiving unit 104 is video data, still image data, subtitle data and text data is described by way of illustration.

The processing unit 108 includes an image processing unit 134, a buffer 136, and a display image buffer 138.

The image signal transmitted from the receiving unit 104 and the first display control information are input to the image processing unit 134, and the image processing unit 134 selectively performs various image processing on the image signal based on the first display control information. Specifically, when the first display control information shown in FIG. 11 is transmitted, for example, the image processing unit 134 identifies each region based on the information indicated by G in FIG. 11, and selectively performs processing for displaying a three-dimensional image based on the information indicated by H in FIG. 11. Further, the image processing unit 134 recognizes the position of each region based on the information indicated by I in FIG. 11, and performs scaling processing or the like so that the region is placed in the position indicated by the information, for example.

The image processing in the image processing unit 134 may be scaling processing, interlace/progressive conversion processing, processing for displaying a three-dimensional image, processing for conversion into a still image format or the like, for example, though not limited thereto. For example, when "information that defines processing when making superimposition on another region" (e.g. C in FIG. 5) is included in the region information processed by the display control unit 106, though not shown in FIG. 11, the first display control information includes a processing command corresponding to the information that defines processing when making superimposition on another region. In the above case, the image processing unit 134 can perform processing corresponding to the processing command included in the first display control information.

Further, FIG. 12 shows the configuration in which the image processing unit 134 includes a first image processing unit 134a that processes video data, a second image processing unit 134b that processes still image data, a third image processing unit 134c that processes subtitle data, and a fourth image processing unit 134d that processes text data. The configuration of the image processing unit 134 shown in FIG. 12 shows some of functions of the image processing unit 134, and the configuration of the image processing unit 134 is not limited thereto.

The buffer 136 stores the processed video data, still image data, subtitle data and text data that are output from the image processing unit 134. Although FIG. 12 shows the configuration of the buffer 136 that includes a first buffer 136a to a fourth buffer 136d respectively corresponding to the first image processing unit 134a to the fourth image processing unit 134d, the configuration of the buffer 136 is not limited thereto.

Further, the buffer 136 selectively transmits the stored data to the display image buffer 138 according to the control signal transmitted from the display control unit 106.

The display image buffer 138 stores display image data (image data corresponding to an image where images of the respective regions are arranged) to be displayed on a display screen based on the video data, still image data, subtitle data and text data transmitted from the buffer 136.

Further, the display image buffer 138 selectively transmits the stored display image data to the display unit 110 according to the control signal transmitted from the display control unit 106. The display image data output from the display image buffer 138 corresponds to the display image signal.

With the configuration shown in FIG. 12, for example, the processing unit 108 can generate the display image signal indicating an image in which the first region and the second region are arranged according to the first display control information based on the image signal transmitted from the receiving unit 104 and the first display control information transmitted from the display control unit 106.

[2] Second Example

Figure 13:
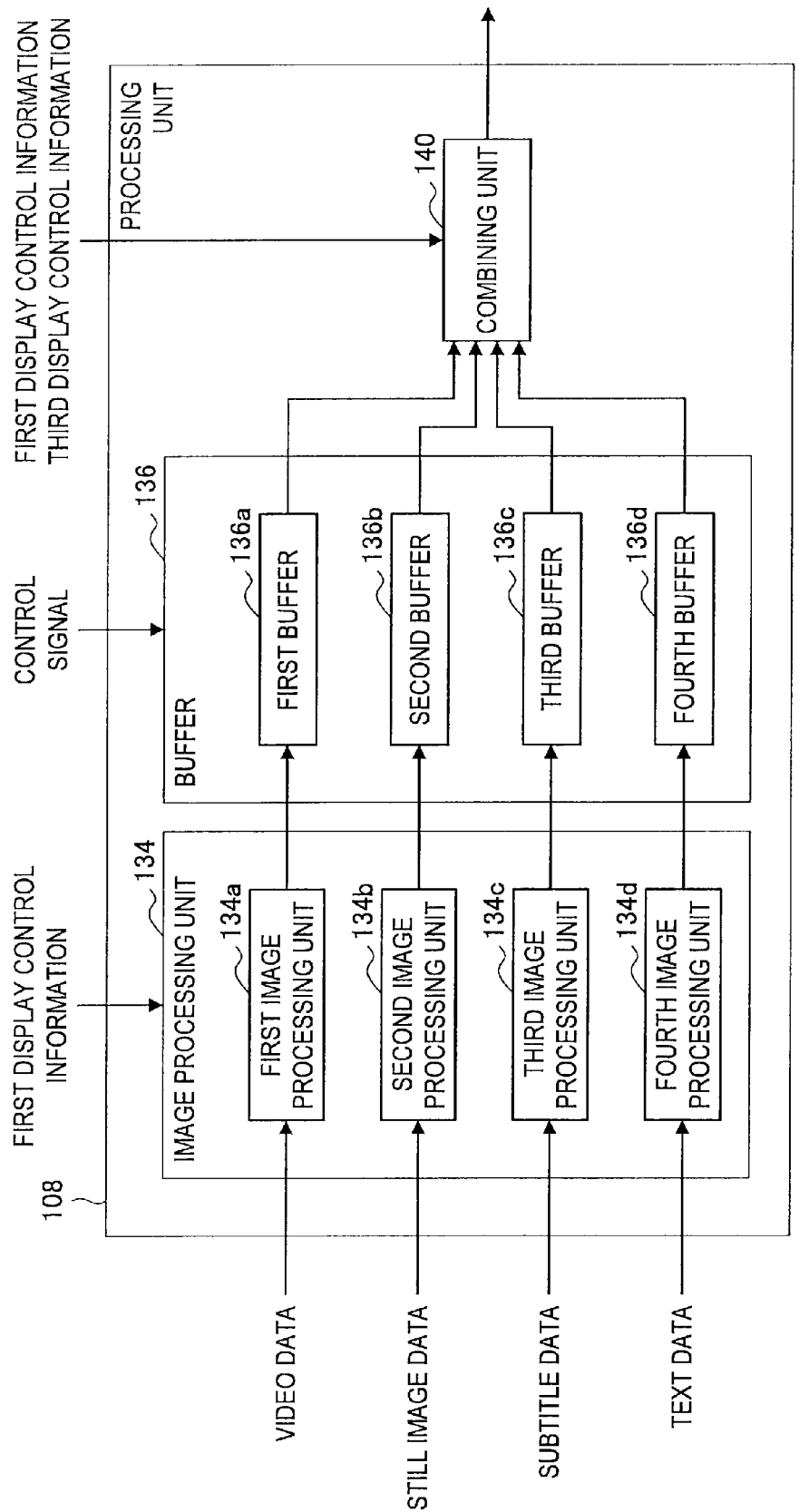
FIG. 13 is an explanatory view showing another example of a configuration of a processing unit included in an image signal processing apparatus according to an embodiment of the present invention.

FIG. 13 is an explanatory view showing another example of a configuration of the processing unit 108 included in the image signal processing apparatus 100 according to an embodiment of the present invention. FIG. 13 shows an example of a configuration of the processing unit 108 in the case where the image signal processing apparatus 100 performs processing based on the region information shown in FIG. 6.

The processing unit 108 includes an image processing unit 134, a buffer 136, and a combining unit 140. The image processing unit 134 and the buffer 136 shown in FIG. 13 have the similar function and configuration to the image processing unit 134 and the buffer 136 according to the first example shown in FIG. 12. Note that, in the processing unit 108 according to the second example, the image processing unit 134 may be placed in the subsequent stage of the buffer 136.

The combining unit 140 combines the respective data stored in the buffer 136 based on the respective data from the buffer 136, the first display control information transmitted from the display control unit 106 and the third display control information, and outputs a display image signal. The combining unit 140 inactivates display control for a region where the value of the third display control information indicates "0" and activates display control for a region where the value indicates "1", for example. Further, the combining unit 140 places each region to the position indicated by the first display control information transmitted from the display control unit 106. Further, when the first display control information transmitted from the display control unit 106 includes a processing command corresponding to the information that defines processing when making superimposition on another region, for example, the combining unit 140 performs processing according to the processing command included in the first display control information.

With the configuration shown in FIG. 13, for example, the processing unit 108 can generate the display image signal indicating an image in which the first region and the second region are arranged according to the first display control information based on the image signal transmitted from the receiving unit 104 and the first display control information transmitted from the display control unit 106.

Note that the configuration of the processing unit included in the image signal processing apparatus 100 according to an embodiment of the present invention is not limited to the configuration shown in FIG. 12 or FIG. 13 as a matter of course. Further, in the image signal processing apparatus 100, the control unit (not shown) may serve as the processing unit 108, for example.

Referring back to FIG. 9, an example of the configuration of the image signal processing apparatus 100 is further described. The display unit 110 displays a two-dimensional image, a three-dimensional image, or an image containing both a two-dimensional image and a three-dimensional image on a display screen based on the second display control information transmitted from the display control unit 106 and the display image signal transmitted from the processing unit 108. Specifically, the display unit 110 displays an image corresponding to the display image signal on the display screen and selectively displays a three-dimensional image in the region corresponding to the rendering position of the second region in the display screen based on the second display control information.

The display unit 110 may be a liquid crystal display (LCD) capable of selectively applying voltage based on the second display control information and forming a cylindrical lens (e.g. FIGS. 2A and 2B), for example, though not limited thereto. For example, in the case where the display unit 110 has a parallax barrier and displays a three-dimensional image in a parallax barrier system, the display unit 110 selectively controls the parallax barrier based on the second display control information. Further, in the above case, the display unit 110 may be provided with various kinds of display device such as a liquid crystal display, an organic EL display (organic ElectroLuminescence display; also called OLED display (Organic Light Emitting Diode display)), FED (Field Emission Display) or PDP (Plasma Display Panel), for example.

The image signal processing apparatus 100 can implement processing related to the approach to enhance image quality according to an embodiment of the present invention described above by the configuration shown in FIG. 9, for example. Therefore, by performing the above-described processing, for example, the image signal processing apparatus 100 can enhance image quality when displaying an image containing both a two-dimensional image and a three-dimensional image on a display screen.

It should be noted that a configuration of the image signal processing apparatus according to an embodiment of the present invention is not limited to the configuration shown in FIG. 9. For example, the image signal processing apparatus according to an embodiment of the present invention may have a configuration which does not include the display unit 110 shown in FIG. 9 but includes a transmitting unit that transmits the display image signal and the second display control information to a display apparatus as an external apparatus. Further, the image signal processing apparatus according to an embodiment of the present invention may further include the transmitting unit in addition to the configuration shown in FIG. 9. The transmitting unit may be a connection interface such as HDMI, for example, though not limited thereto.

With the above configuration also, the image signal processing apparatus according to an embodiment of the present invention can display an image containing both a two-dimensional image and a three-dimensional image based on the display image signal and the second display control information on a display screen of the display apparatus as an external apparatus. Therefore, with the above configuration also, the image signal processing apparatus according to an embodiment of the present invention can enhance image quality when displaying an image containing both a two-dimensional image and a three-dimensional image on a display screen.

[Transmitting Apparatus 200]

The transmitting apparatus 200 generates a display signal that includes an image signal and a region information for each predetermined unit in the image signal, and transmits the generated display signal to the image signal processing apparatus that constitutes the image signal processing system 1000 through the broadcast wave 300 and/or via the network 400.

[Exemplary Hardware Configuration of Transmitting Apparatus 200]

Figure 14:
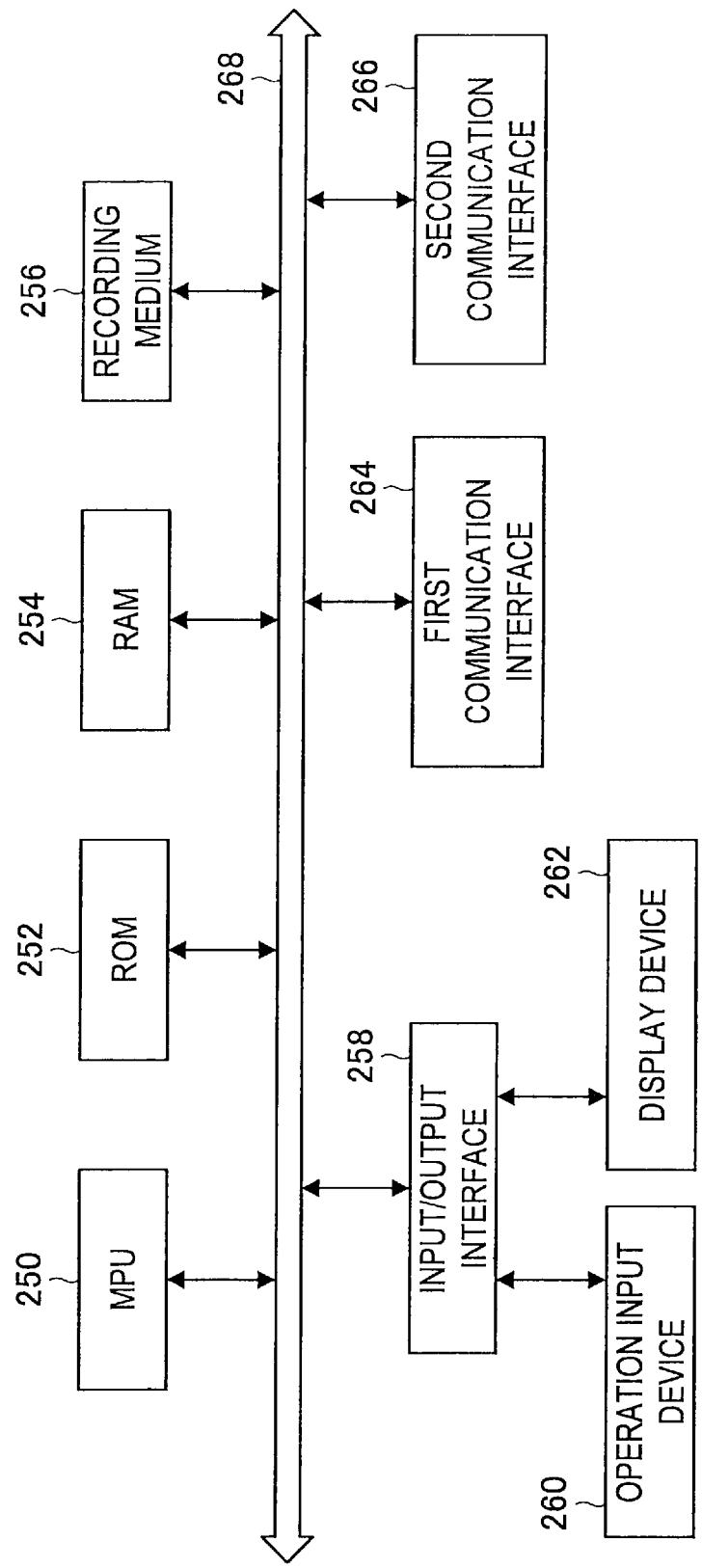
FIG. 14 is an explanatory view showing an example of a hardware configuration of a transmitting apparatus according to an embodiment of the present invention.

FIG. 14 is an explanatory view showing an example of a hardware configuration of the transmitting apparatus 200 according to an embodiment of the present invention. The transmitting apparatus 200 includes MPU 250, ROM 252, RAM 254, a recording medium 256, an input/output interface 258, an operation input device 260, a display device 262, a first communication interface 264, and a second communication interface 266. Further, the transmitting apparatus 200 connects among the components though a bus 268 as a data transmission line, for example.

The MPU 250 is composed of MPU, an integrated circuit where a plurality of circuits for implementing control functions are integrated or the like, and functions as a control unit (not shown) that controls the transmitting apparatus 200 as a whole.

Further, the MPU 250 plays a leading role in processing of generating a display signal. The MPU 250 generates a region information for each predetermined unit in the image signal based on a user operation by a user of the transmitting apparatus 200 transmitted from the operation input device 260, an analysis result of the image signal to be transmitted or the like. Then, the MPU 250 generates a display signal by inserting the generated region information into a bit-stream. Note that the generation processing of a display signal according to an embodiment of the present invention is not limited thereto.

The ROM 252 stores control data such as a program or a calculation parameter to be used by the MPU 250, and the RAM 254 temporarily stores the program or the like executed by the MPU 250.

The recording medium 256 is a storage means in the transmitting apparatus 200 and functions as a storage unit (not shown) in the transmitting apparatus 200. The recording medium 256 stores various kinds of data such as contents data corresponding to an image signal to be transmitted or various applications. The recording medium 256 may be a magnetic recording medium such as a hard disk or nonvolatile memory such as flash memory, for example, though not limited thereto. Further, the transmitting apparatus 200 may have the recording medium 256 in a detachable manner.

The input/output interface 258 makes a connection with the operation input device 260 and the display device 262, for example. The input/output interface 258 may be a USB (Universal Serial Bus) terminal, a DVI (Digital Visual Interface) terminal, an HDMI terminal, various kinds of processing circuits or the like, for example, though not limited thereto. Note that the input/output interface 258 may make a connection with an operation input device (e.g. a keyboard, a mouse etc.), a display device (e.g. an external display etc.) as an external apparatus of the transmitting apparatus 200 as a matter of course.

The operation input device 260 functions as an operating unit (not shown) in the transmitting apparatus 200. Further, the operation input device 260 is placed on the transmitting apparatus 200 and connected to the input/output interface 258 inside the transmitting apparatus 200, for example. The operation input device 260 may be a button, a direction key, or a rotating selector such as a jog dial, or a combination of those, for example, though not limited thereto.

The display device 262 functions as a display unit (not shown) that displays various kinds of screens such as an operation screen for a user to make a desired operation, for example, on a display screen. The display device 262 is placed on the transmitting apparatus 200 and connected to the input/output interface 258 inside the transmitting apparatus 200, for example. The display device 262 may be a liquid crystal display, an organic EL display or the like, for example, though not limited thereto.

The first communication interface 264 is a first communication means included in the transmitting apparatus 200 and functions as a first communication unit (not shown) for wireless/wired communication with an external apparatus via the network 400 (or directly). The first communication interface 264 may be a LAN terminal, a transmitter-receiver circuit or the like, for example, though not limited thereto. For example, the first communication interface 264 may have a configuration compatible with the network 400.

The second communication interface 266 is a second communication means included in the transmitting apparatus 200 and functions as a second communication unit (not shown) for transmitting a display signal to an external apparatus through the broadcast wave 300. The second communication interface 266 may be a modulator, an RF (Radio Frequency) transmitter or the like, for example, though not limited thereto.

With the configuration shown in FIG. 14, for example, the transmitting apparatus 200 can generate a display signal and transmit the generated display signal to the image signal processing apparatus that constitutes the image signal processing system 1000 through the broadcast wave 300 and/or via the network 400. It should be noted that the hardware configuration of the transmitting apparatus 200 according to an embodiment of the present invention is not limited to the configuration shown in FIG. 14 as a matter of course.

As described above, the image signal processing system 1000 according to an embodiment of the present invention includes the transmitting apparatus 200 that transmits a display signal and the image signal processing apparatus 100 that processes the display signal. The image signal processing apparatus 100 generates a display image signal based on an image signal and a region information separated from the display signal and a second display control information based on the region information, and transmits the display image signal and the second display control information to a display device. The image signal processing apparatus 100 performs processing by separating the image signal and the region information from the display signal including the image signal and the region information. Therefore, with use of an information of a time stamp set to the image signal or the like, for example, the image signal processing apparatus 100 can synchronize the image signal and the region information without incorporating any particular mechanism for associating the image signal and the region information. Further, the image signal processing apparatus 100 can synchronize the image signal and the region information in the same manner as above in the case of displaying an image indicated by contents data corresponding to the display signal stored in a storage medium on a display screen as well. Therefore, in the image signal processing system 1000 that includes the image signal processing apparatus 100, because synchronization between the image signal and the region information that defines the first region and the second region can be achieved, there is no possibility that an event that leads to degradation of image quality, such as a decrease in resolution, occurs as in the case of using the related art. Further, in the image signal processing system 1000 that includes the image signal processing apparatus 100, because a three-dimensional image is displayed in the part where a cylindrical lens is formed, there is no decrease in the resolution of a two-dimensional image.

Therefore, the image signal processing apparatus 100 can enhance image quality when displaying an image containing both a two-dimensional image and a three-dimensional image on a display screen. Further, with inclusion of the image signal processing apparatus 100 and the transmitting apparatus 200, there is provided the image signal processing system 1000 that can enhance image quality when displaying an image containing both a two-dimensional image and a three-dimensional image on a display screen.

Although the image signal processing apparatus 100 is described above as an example of the component of the image signal processing system 1000 according to an embodiment of the present invention, an embodiment of the present invention is not limited thereto. An embodiment of the present invention may be applied to various kinds of equipment including a computer such as PC (Personal Computer), a mobile communication device such as a cellular phone or PHS (Personal Handyphone System), a video/music player (or a video/music recorder/player), a portable game machine, a set-top box, a television set or the like, for example.

Further, although the transmitting apparatus 200 is described above as an example of the component of the image signal processing system 1000 according to an embodiment of the present invention, an embodiment of the present invention is not limited thereto. An embodiment of the present invention may be applied to various kinds of equipment such as a server or a computer such as PC.

(Program According to Embodiment of Present Invention)

By a program for causing a computer to function as an image signal processing apparatus according to an embodiment of the present invention, it is possible to enhance image quality when displaying an image containing both a two-dimensional image and a three-dimensional image on a display screen.

It should be understood by those skilled in the art that various modifications, combinations, sub-combinations and alterations may occur depending on design requirements and other factors insofar as they are within the scope of the appended claims or the equivalents thereof.

For example, although a program (computer program) for causing a computer to function as an image signal processing apparatus according to an embodiment of the present invention is provided in the above description, a storage medium that stores such a program may be further provided according to an embodiment of the present invention.

The above-described configuration is an example of an embodiment of the present invention, which is intended for inclusion within the scope of the present invention.

What is claimed is:

1. An image signal processing apparatus, comprising:
  a receiving unit that receives a display signal including an image signal containing both a two-dimensional image and a three-dimensional image, region information defining a first region to display the two-dimensional image, a second region to display the three-dimensional image and including data to control activation or deactivation of the first or second region and timing information defining a time associated with the received display signal, and that separates the image signal, the region information, and the timing information from the received display signal;
  a display control unit that generates and transmits first display control information for controlling rendering positions of the first region and the second region in the image signal according to the region information separated by the receiving unit, a control signal according to the timing information and second display control information for selectively displaying a three-dimensional image in a region corresponding to the rendering position of the second region on the display screen based on the region information separated by the receiving unit, the display control unit transmitting the second display control signal based on a comparison of the timing information and a reference clock signal; and a processing unit that generates a display image signal indicating where the first region and the second region are arranged according to the first display control information generated by the display control unit and the image signal separated by the receiving unit, and outputs the display image signal in synchronization with transmission of the second display control information.

2. The image signal processing apparatus according to claim 1, wherein the region information includes an information defining a sequence of processing and an information defining display processing when making superimposition on a previously processed region, the display control unit generates the first display control information defining display processing for each region based on the region information, and the processing unit generates the display image signal indicating where display processing based on the first display control information is performed for each region.

3. The image signal processing apparatus according to claim 1, further comprising:

a display unit that displays an image corresponding to the display image signal on a display screen, and selectively displays a three-dimensional image in a region corresponding to the rendering position of the second region on the display screen based on the second display control information.

4. The image signal processing apparatus according to claim 1, wherein the timing information includes a time stamp associated with the image signal.

5. The image signal processing apparatus according to claim 1, wherein the timing information includes a time stamp associated with the region information.

6. An image signal processing method, comprising:

receiving a display signal including an image signal containing both a two-dimensional image and a three-dimensional image, and region information defining in a predetermined unit a first region to display the two-dimensional image, a second region to display the three-dimensional image, and including data to control activation or deactivation of the first or second region and timing information defining a time associated with the received display signal;

separating the image signal, the region information, and the timing information from the received display signal;

generating first display control information for controlling rendering positions of the first region and the second region in the image signal according to the separated region information, a control signal according to the separated timing information, and second display control information for selectively displaying a three-dimensional image in a region corresponding to the rendering position of the second region on the display screen based on the separated region information;

transmitting the first display control information, the control signal, and the second display control information based on a comparison of the timing information and a reference check signal;

generating a display image signal indicating where the first region and the second region are to be displayed according to the first display control information generated in the generating step and the image signal separated in the separating step; and outputting the display image signal in synchronization with transmission of the second display control information according to the control signal.

7. The image signal processing method according to claim 6, wherein the timing information includes a time stamp associated with the image signal.

8. The image signal processing method according to claim 6, wherein the timing information includes a time stamp associated with the region information.

9. A non-transitory computer readable medium storing a computer program causing a computer to execute a process, the process comprising:

receiving a display signal including an image signal containing both a two-dimensional image and a three-dimensional image, and region information defining in a predetermined unit a first region to display the two-dimensional image and a second region to display the three-dimensional image and including data to control activation or deactivation of the first or second region, and timing information defining a time associated with the received display signal;

separating the image signal, the region information, and the timing information from the received display signal;

generating first display control information for controlling rendering positions of the first region and the second region in the image signal according to the separated region information, a control signal according to the separated timing information, and second display control information for selectively displaying a three-dimensional image in a region corresponding to the rendering position of the second region on the display screen based on the separated region information;

transmitting the first display control information, the control signal, and the second display control information based on a comparison of the timing information and a reference clock signal;

generating a display image signal indicating where the first region and the second region are arranged according to the first display control information generated in the generating step and the image signal separated in the separating step; and outputting the display image signal in synchronization with transmission of the second display control information.

10. The computer-readable medium according to claim 9, wherein the timing information includes a time stamp associated with the image signal.

11. The computer-readable medium according to claim 9, wherein the timing information includes a time stamp associated with the region information.

12. An image signal processing system, comprising:

a transmitting apparatus that transmits a display signal including an image signal containing both a two-dimensional image and a three-dimensional image, region information defining in a predetermined unit a first region to display the two-dimensional image and a second region to display the three-dimensional image when displaying the image indicated by the image signal, and timing information defining a time associated with the received display signal; and an image signal processing apparatus including:

a receiving unit that receives a display signal including an image signal containing both a two-dimensional image and a three-dimensional image, region information defining in a predetermined unit a first region to display the two-dimensional image and a second region to display the three-dimensional image when displaying the image indicated by the image signal, and timing information defining a time associated with the received display signal, and separates the image signal, the region information, and the timing information from the received display signal;

a display control unit that generates and transmits first display control information for controlling rendering positions of the first region and the second region in the image signal according to the region information separated by the receiving unit, a control signal according to the timing information separated by the receiving unit, and second display control information for selectively displaying a three-dimensional image in a region corresponding to the rendering position of the second region on the display screen based on the region information separated by the receiving unit the display control unit transmitting the second display control signal based on a comparison of the timing information and a reference clock signal; and a processing unit that generates a display image signal indicating where the first region and the second region are arranged according to the first display control information generated by the display control unit and the image signal separated by the receiving unit, and outputs the display image signal in synchronization with transmission of the second display control information and according to the control signal.

13. The image signal processing system according to claim 12, wherein the timing information includes a time stamp associated with the image signal.

14. The image signal processing system according to claim 12, wherein the timing information includes a time stamp associated with the region information.

* * * * *